United States Patent Office 2,745,873
Patented May 15, 1956

2,745,873
PROCESS OF PRODUCING N-ACETYL METHIONINE

John P. Callanan, Pasadena, and Abner P. Patton, Glen Burnie, Md., assignors to National Distillers Products Corporation, New York, N. Y., a corporation of Virginia No Drawing. Application February 2, 1953, Serial No. 334,716

8 Claims. (Cl. 260—534)

This invention relates to the manufacture of N-acetyl methionine and provides an improved method whereby that compound is formed by reacting methionine with acetic anhydride and whereby the resultant N-acetyl methionine can be obtained directly from the reaction mixture as a crystalline product of commercial purity.

The desired reaction may be graphically represented by the following equation:

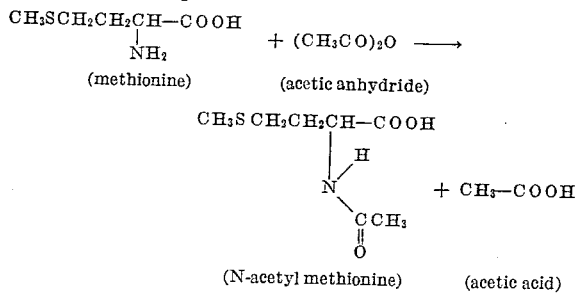

N-acetyl methionine is of particular utility in those fields requiring the use of methionine as a therapeutic agent because of its increased solubility in water. The sodium salt of N-acetyl methionine is extremely soluble in water and its pH characteristic is close to the neutral point.

It has previously been proposed to acetylate methionine by reacting acetic anhydride with the methionine dissolved in glacial acetic acid. It has also been proposed to acetylate the sodium salt of methionine in aqueous solution by reaction with acetic anhydride or ketene.

However, previous methods proposed for the acetylation of methionine have been subject to certain disadvantages which have detracted from their commercial use. For instance, where the acetylation is carried out in glacial acetic acid, it is necessary that the latter be removed by distillation, preferably under reduced pressure, before the N-acetyl methionine can be isolated. When the acetylation is carried out in aqueous alkaline solution, it is essential that substantially all the water be removed before the N-acetyl methionine can be separated by crystallization. This latter method also requires acidification of the reaction mixture since the sodium salt is so soluble in water that its crystallization therefrom is exceedingly difficult. If the water is not removed from the aqueous reaction mixture by distillation, one must resort to solvent extraction with its attendant difficulties and relatively low recovery.

It will be understood that reference herein and in the appended claims to methionine is intended to mean the ordinary dl-methionine commercially available.

It is an object of my present invention to provide a simple method of producing N-acetyl methionine whereby the previously experienced difficulties are avoided and the desired product can be obtained directly by crystallization from the reaction mixture. A further object is to obtain directly from the reaction mixture a product of commercial purity and particularly low in N-acetyl methionylmethionine, a by-product normally found in N-acetyl methionine in substantial amounts, particularly where the acetylation is carried out under anhydrous conditions.

These and other advantages, as will hereinafter appear, are obtained by my present process, in accordance with which methionine is reacted with acetic anhydride in the presence of an organic liquid reaction medium which is inert with respect to the acetic anhydride, methionine and N-acetyl methionine and which is a solvent for the N-acetyl methionine at the reaction temperature. Following the reaction, the mixture is cooled and the N-acetyl methionine is thereby crystallized directly from the reaction mixture in a surprisingly high state of purity.

As appears from the foregoing equation, the acetic anhydride and methionine react mol for mol. However, it is generally advantageous to use a proportion of the acetic anhydride slightly in excess of that theoretically required, in order to force the reaction more nearly to completion.

Organic liquids suitable for use as the reaction medium, must necessarily be inert with respect to acetic anhydride in order that there be no contamination of the desired product with other acetylation products and it must be a solvent for the N-acetyl methionine and preferably have good solvent action therefor at the temperature of the reaction and greatly reduced solubility therefor at lower temperatures. The reaction medium should also be inert with respect to the methionine and N-acetyl methionine. Advantageously, the medium should have little or no solvent action on the methionine, but preferably is a solvent for the acetic anhydride.

For this purpose, we have, with advantage, used lower alkyl acetates or ketones. For instance, ethyl acetate (99% purity) and acetone have been found to be particularly efficacious. Other similar esters and ketones which may be used, with advantage, include methyl acetate, n-propyl acetate, isopropyl acetate, butyl acetate, methyl ethyl ketone, and diethyl ketone. The inert liquid used should have a boiling point not greatly exceeding 100° C. and more advantageously between about 55° C. and 90° C.

Since methionine is relatively insoluble in useful reaction media, it is, with advantage, introduced in a finely divided form so as to offer an increased amount of surface to the acetic anhydride and thus expedite the reaction. It has been found that a particle size of 80 (A. S. T. M.) mesh or finer is most advantageous. When larger sized particles, or lumps of methionine, are used, there is a tendency toward the formation of increased amounts of N-acetyl methionylmethionine, probably due to the longer reaction time required. The finely divided methionine is, with advantage, mixed with the organic reaction medium to form a slurry prior to the adition of the acetic anhydride.

The acetylation of methionine is an exothermic reaction and the heat evolved may be conventionally dissipated by allowing the reaction medium to boil and condensing and returning the condensed vapors to the reaction mixture. When a higher boiling reaction medium is used, the boiling point, and thus the reaction temperature, may be lowered by decreasing the pressure on the reaction system. Conversely, when a reaction medium is used having a boiling point so low that the reaction rate is too slow for commercial purposes, the temperature of the reaction mixture may be increased by increasing the total pressure on the reaction system.

By proper choice of reaction medium and by adjusting the pressure on the reaction system, the reaction temperature may be varied over a considerable range. I have found, however, that, in order to minimize the formation of N-acetyl methionylmethionine, the reaction temperature should not greatly exceed 100° C. Reaction temperatures of about 80° to 90° C. have been found to give adequate speed of reaction for commercial purposes with a minimum of undesirable by-product formation and, therefore, have been found to be particularly advantageous. Lower reaction temperatures are generally undesirable because of decreased reaction rate, but are otherwise acceptable. It is generally undesirable to carry out the reaction at temperatures below about room temperature.

The ratio of the inert reaction medium to methionine is not particularly critical. Excellent results have been obtained where about 1.5 parts to 2.5 parts of inert medium per part of methionine, by weight, were used. Still greater proportions of solvent may be used but will result in a decreased amount of crystallized, N-acetyl methionine separating from the reaction mixture on cooling, as will be presently described.

As the reaction proceeds, the N-acetyl methionine is dissolved in the inert reaction medium as formed and is crystallized therefrom by cooling the reaction medium, advantageously to a temperature within the range of about −20° C. to 20° C. Crystallization temperatures within the range of −10° C. to 15° C. have been used, with particular advantage. As the temperature of the reaction mixture is lowered, the solubility of the N-acetyl methionine will decrease with the resultant separation of the product therefrom in crystalline form.

As previously noted, ethyl acetate and acetone have been used with particular advantage as a reaction medium. They have been found to be good solvents for N-acetyl methionine at reaction temperature and to have but little solvent power for methionine. Hydrocarbons of suitable boiling range are also inert with respect to acetic anhydride but have only slight solvent action for N-acetyl methionine and are, therefore, less useful as the reaction media.

While the reaction will proceed under conditions previously described in the absence of any water or inorganic acid, we have found it particularly advantageous to carry out the reaction in the presence of small controlled amounts of water and an inorganic acid. In the absence of water and inorganic acid, completion of the acetylation is more difficult and, under such conditions, increased amounts of the by-product N-acetyl methionylmethionine have been obtained.

For best results, water should be present in the reaction mixture in an amount within the range of about 0.4% to 7.0%, based on the weight of methionine. If substantially more than about 7.0% of water is present, a loss of acetic anhydride is experienced due to its hydrolysis to acetic acid. Especially good results have been obtained where 3.0% water, based on the weight of methionine, has been used.

As the inorganic acid present during the reaction, any strong inorganic acid may be used, but sulfuric acid and phosphoric acid have been used with particular advantage. For best results, the amount of such inorganic acid present should be within the range of 0.1% to 0.7%, based on the weight of methionine used. Particularly good results have been obtained using about 0.5% acid.

The effect of varying the amount of water, the amount and kind of acid and the reaction medium used upon the purity of the crystalline N-acetyl methionine separated from the reaction mixture, at the indicated temperatures, are illustrated by the data set forth in the table below. In each of these operations, the amount of acetic anhydride used was 9% in excess of the theoretical requirement, the methionine was of a fineness equivalent to 80 mesh and 1.3 parts of the reaction medium was used per part of methionine by weight. The reaction temperature was approximately 80° C. in those operations where ethyl acetate was used as the reaction medium and approximately 65° C. where acetone was used as the reaction medium.

TABLE

| Reaction Medium | Percent Water | Acid | | Percent purity of N-acetyl methionine crystallizing at ° C. | | | | | |
|---|---|---|---|---|---|---|---|---|---|
| | | Kind | Percent | −10° | −7½° | −2½° | 0° | 2° | 8° |
| ethyl acetate | 0.0 | H₂SO₄ | 0.0 | | 94–95 | | | 97 | 98.2–98.5 |
| Do | 3.0 | H₂SO₄ | 0.0 | 97.2–99.0 | | | | | 97.8–98.8 |
| Do | 3.0 | H₂SO₄ | 0.2 | 96.7 | | | | | 99.0–99.4 |
| Do | 3.0 | H₂SO₄ | 0.5 | 98.3–99.0 | | | | | 97.5–99.3 |
| Do | 7.0 | H₂SO₄ | 0.8 | 98.3–99.0 | | | | | 98.2 |
| Do | 15.0 | H₂SO₄ | 0.8 | 97.2–97.7 | | 97.4 | | | 99.2 |
| Do | 3.0 | H₃PO₄ | 0.8 | 99.3 | | | | | |
| acetone | 3.0 | H₃PO₄ | 0.8 | | | | 98.5 | | |

The invention will be further illustrated by the following specific examples:

*Example I*

150 grams of methionine, of about 80 mesh particle size, and 250 cc. of ethyl acetate of 99% purity were placed in a 1 liter glass flask, equipped with a stirrer, reflux condenser, thermometer, dropping funnel and heating mantle. This mixture was agitated and the agitation continued throughout the reaction period. A solution of 1 gram of concentrated sulfuric acid in 5 grams of water was added and thereafter 108 grams of acetic anhydride was added and the mixture slowly heated to the boiling point of the mixture, about 80° C. Heating was continued with refluxing until a clear solution resulted, this requiring about 20 minutes. The reaction mixture was then transferred to a beaker and cooled to 5° C. which resulted in crystallization of the N-acetyl methionine formed by the reaction. The mixture was then filtered through a Buchner funnel to separate the crystals and the separated crystals were washed with cold ethyl acetate and then dried in a vacuum drier at a temperature of about 80° C. There was obtained by this reaction 150 grams of dry, white granular crystals having a melting point of 113–115° C. and consisting of N-acetyl methionine of a purity of 98.5%.

*Example II*

The components and proportions thereof used in Example I, except that 250 cc. of acetone was used in place of the ethyl acetate, were placed in the flask, agitated and heated to the boiling point, as described in the preceding example. In this operation, the boiling point of the mixture was about 65° C. and the refluxing was continued for approximately 1 hour. The mixture was then cooled to 5° C. and filtered, the crystals thus recovered being washed with cold acetone and dried. This operation resulted in 139 grams of crystalline N-acetyl methionine having a melting point of 113–115° C. and a purity of 98.5%.

*Example III*

150 pounds of methionine, of a particle size approximately 80 mesh, and 220 pounds of ethyl acetate were mixed in a 150 gallon vessel, equipped with an agitator, a steam jacket, an inlet connection and a reflux condenser. The mixture was agitated to form a slurry and the agitation was continued throughout the reaction. To this slurry there was added a solution of 0.5 pound concentrated sulfuric acid and 5 pounds of water. There was then added 108 pounds of acetic anhydride and the temperature of the mixture was raised to the boiling point of the mixture and this temperature maintained with refluxing until a clear solution resulted. The reaction mixture was then transferred to a crystallizer, cooled to 5° C. and filtered to separate the resultant crystals. These crystals were then washed with cold ethyl acetate and dried under a vacuum at a temperature of about 80° C. By this operation, there was obtained 150 pounds of N-acetyl methionine crystals having a melting point of 113–115° C. and a purity of 98.5%.

We claim:

1. Method of producing N-acetyl methionine which comprises reacting acetic anhydride with methionine at an elevated temperature not exceeding about 100° C. in an organic liquid reaction medium inert with respect to acetic anhydride and boiling within the range of about 55° C.–100° C., said medium being a solvent for the N-acetyl methionine at the reaction temperature, and thereafter cooling the reaction mixture and thereby crystallizing the N-acetyl methionine from the solution.

2. The method of claim 1 in which the reaction medium is selected from the group consisting of the lowed alkyl acetates and ketones.

3. The process of claim 2 in which the reaction medium is ethyl acetate.

4. The process of claim 2 in which the reaction medium is acetone.

5. The process of claim 1 in which the reaction medium is one having a boiling point within the range of 55° to 90° C.

6. The process of claim 1 in which the reaction is carried out in the presence of water in an amount within the range of 0.4% to 7% and a small amount of a strong inorganic acid within the range of 0.1% to 0.7%, each based on the weight of methionine.

7. The process of claim 1 in which the methionine is introduced as a slurry of finely divided methionine of a particle size not exceeding 80 mesh.

8. The process of claim 1 in which the reaction is carried out at a temperature within the range of 80° to 90° C.

References Cited in the file of this patent
UNITED STATES PATENTS 2,397,628    Snyder _____ Apr. 2, 1946

OTHER REFERENCES

MacArdle: "Solvents in Synthetic Org. Chem." (van Nostrand), pgs. 1–3, 7–11, 13–17 (1925).